US006995603B2

(12) United States Patent
Chen et al.

(10) Patent No.: US 6,995,603 B2
(45) Date of Patent: Feb. 7, 2006

(54) HIGH EFFICIENCY CHARGE PUMP WITH PREVENTION FROM REVERSE CURRENT

(75) Inventors: Tien-Tzu Chen, Hsin-Chu (TW); Guang-Nan Tzeng, Hsin-Chu (TW)

(73) Assignee: Aimtron Technology Corp., Hsinchu (TW)

( * ) Notice: Subject to any disclaimer, the term of this patent is extended or adjusted under 35 U.S.C. 154(b) by 52 days.

(21) Appl. No.: 10/708,442

(22) Filed: Mar. 3, 2004

(65) Prior Publication Data

US 2005/0195017 A1 Sep. 8, 2005

(51) Int. Cl.
*G05F 3/02* (2006.01)

(52) U.S. Cl. .......................................... 327/536; 363/60

(58) Field of Classification Search ................ 327/534, 327/535, 537; 363/60
See application file for complete search history.

(56) References Cited

U.S. PATENT DOCUMENTS

| | | | | |
|---|---|---|---|---|
| 5,258,662 | A | 11/1993 | Skovmand | |
| 5,343,088 | A * | 8/1994 | Jeon | 327/536 |
| 5,394,027 | A | 2/1995 | Park | |
| 5,502,415 | A * | 3/1996 | Matsui et al. | 327/536 |
| 5,521,547 | A * | 5/1996 | Tsukada | 327/537 |
| 5,633,825 | A * | 5/1997 | Sakuta et al. | 365/189.09 |
| 6,107,863 | A | 8/2000 | Iwata | |
| 6,198,341 | B1 * | 3/2001 | Ryu | 327/536 |
| 6,278,315 | B1 * | 8/2001 | Kim | 327/536 |
| 6,400,203 | B1 | 6/2002 | Bezzi et al. | |
| 6,483,728 | B1 | 11/2002 | Johnson et al. | |
| 6,501,325 | B1 * | 12/2002 | Meng | 327/536 |
| 6,525,949 | B1 | 2/2003 | Johnson et al. | |
| 6,650,172 | B1 | 11/2003 | Shingyouchi | |
| 2002/0130703 | A1 * | 9/2002 | Tsai | 327/536 |
| 2004/0263238 | A1 * | 12/2004 | Thorp et al. | 327/536 |

OTHER PUBLICATIONS

TianRui Ying et al., "Area-Efficient CMOS Charge Pumps for LCD Drivers", IEEE Journal of Solid-State Circuits, vol. 38, No. 10, Oct. 2003, pp. 1721-1725.

* cited by examiner

*Primary Examiner*—Terry D. Cunningham
(74) *Attorney, Agent, or Firm*—Winston Hsu

(57) ABSTRACT

First and second clocks are applied to first and second capacitors, respectively. First and second former-stage clocks are applied to first and second former-stage capacitors, respectively. A first switch couples the second former-stage capacitor with the first capacitor. A second switch couples the first former-stage capacitor with the second capacitor. A first reverse current preventing circuit couples a control electrode of the first switch alternately with the second capacitor and the second former-stage capacitor. A second reverse current preventing circuit couples a control electrode of the second switch alternately with the first capacitor and the first former-stage capacitor. Falling edges of the first and second clocks occur earlier than falling edges of the first and second former-stage clocks, respectively. Rising edges of the first and second former-stage clocks occur earlier than rising edges of the first and second clocks, respectively.

15 Claims, 9 Drawing Sheets

HIGH EFFICIENCY CHARGE PUMP WITH PREVENTION FROM REVERSE CURRENT

BACKGROUND OF INVENTION

1. Field of the Invention

The present invention relates to a charge pump and, more particularly, to a charge pump capable of preventing from reverse current, thereby generating a pumping voltage with high efficiency.

2. Description of the Related Art

FIG. 1 is a detailed circuit diagram showing a conventional charge pump 10. NMOS transistors $N_1$ and $N_2$ have first current electrodes together coupled to a supply voltage source $V_{in}$. A control electrode of the NMOS transistor $N_1$ is coupled to a second current electrode of the NMOS transistor $N_2$ while a control electrode of the NMOS transistor $N_2$ is coupled to a second current electrode of the NMOS transistor $N_1$. A capacitor $C_1$ has a first electrode coupled to the second current electrode of the NMOS transistor $N_1$ while a capacitor $C_2$ has a first electrode coupled to the second current electrode of the NMOS transistor $N_2$.

An NMOS transistor $N_3$ has a first current electrode coupled to the second current electrode of the NMOS transistor $N_2$ while an NMOS transistor $N_4$ has a first current electrode coupled to the second current electrode of the NMOS transistor $N_1$. A control electrode of the NMOS transistor $N_3$ is coupled to a second current electrode of the NMOS transistor $N_4$ while a control electrode of the NMOS transistor $N_4$ is coupled to a second current electrode of the NMOS transistor $N_3$. A capacitor $C_3$ has a first electrode coupled to the second current electrode of the NMOS transistor $N_3$ while a capacitor $C_4$ has a first electrode coupled to the second current electrode of the NMOS transistor $N_4$.

An NMOS transistor $N_5$ has a first current electrode coupled to the second current electrode of the NMOS transistor $N_3$. Also, the NMOS transistor $N_5$ has a control electrode coupled to its own first current electrode, forming a diode-coupled transistor. A pumping voltage $V_{pp}$ of the charge pump 10 is asserted at a second current electrode of the NMOS transistor $N_5$.

Under the control of clock signals $CLK_1$ and $CLK_2$, the conventional charge pump 10 performs a function of boosting voltage through charge transferring operations. Referring to FIG. 2(*a*), the clock signals $CLK_1$ and $CLK_2$ are a same-stage complementary pair of pulse trains with equal amplitude. In addition, the clock signals $CLK_1$ and $CLK_2$ are so designed as to be non-overlapping with respect to each other for avoiding synchronous occurrence of a high level. Typically, the amplitude of the clock signals $CLK_1$ and $CLK_2$ alternately swings between the supply voltage source $V_{in}$ and a ground potential. As shown in FIG. 1, the clock signals $CLK_1$ is applied to both of second electrodes of the capacitors $C_1$ and $C_3$ while the clock signals $CLK_2$ is applied to both of second electrodes of the capacitors $C_2$ and $C_4$.

Hereinafter is described in detail an operation of the conventional charge pump 10. For understanding the operation of the conventional charge pump 10, it is assumed as an initial condition that the first electrodes of the capacitors $C_1$ and $C_2$ are both at a voltage of $V_{in}$. When the clock signal $CLK_1$ is at the low level and the clock signal $CLK_2$ is at the high level, such as a time interval A shown in FIG. 2(*a*), the first electrode of the capacitor $C_2$ is pushed upwardly to a voltage of $2*V_{in}$, turning on the transistor $N_1$. As a result, the supply voltage source $V_{in}$ charges the capacitor $C_1$, sustaining the first electrode of the capacitor $C_1$ at the voltage of $V_{in}$. Subsequently, when the clock signal $CLK_1$ is at the high level and the clock signal $CLK_2$ is at the low level, such as a time interval B shown in FIG. 2(*a*), the first electrode of the capacitor $C_2$ is pulled downwardly to a voltage of $V_{in}$ and the first electrode of the capacitor $C_1$ is pushed upwardly to a voltage of $2*V_{in}$, turning on the transistor $N_2$. As a result, the supply voltage source $V_{in}$ charges the capacitor $C_2$, sustaining the first electrode of the capacitor $C_2$ at the voltage of $V_{in}$.

Therefore, a first pumping stage of the charge pump 10 is constructed by the transistors $N_1$ and $N_2$ with the capacitors $C_1$ and $C_2$ under the control of the clock signals $CLK_1$ and $CLK_2$, supplying a first stage pumping voltage $2*V_{in}$ to a next pumping stage alternately through the first electrodes of the capacitors $C_1$ and $C_2$.

Similarly, it is assumed as an initial condition that the first electrodes of the capacitors $C_3$ and $C_4$ are both at a voltage of $2*V_{in}$. When the clock signal $CLK_1$ is at the low level and the clock signal $CLK_2$ is at the high level, such as the time interval A shown in FIG. 2(*a*), the first electrode of the capacitor $C_4$ is pushed upwardly to a voltage of $3*V_{in}$, turning on the transistor $N_3$. As a result, the first electrode of the capacitor $C_2$ supplies the capacitor $C_3$ with the first stage pumping voltage $2*V_{in}$, sustaining the first electrode of the capacitor $C_3$ at the voltage of $2*V_{in}$. Subsequently, when the clock signal $CLK_1$ is at the high level and the clock signal $CLK_2$ is at the low level, such as the time interval B shown in FIG. 2(*a*), the first electrode of the capacitor $C_4$ is pulled downwardly to a voltage of $2*V_{in}$ and the first electrode of the capacitor $C_3$ is pushed upwardly to a voltage of $3*V_{in}$, turning on the transistor $N_4$. As a result, the first electrode of the capacitor $C_1$ supplies the capacitor $C_4$ with the first stage pumping voltage $2*V_{in}$, sustaining the first electrode of the capacitor $C_4$ at the voltage of $2*V_{in}$.

Therefore, a second pumping stage of the charge pump 10 is constructed by the transistors $N_3$ and $N_4$ with the capacitors $C_3$ and $C_4$ under the control of the clock signals $CLK_1$ and $CLK_2$, supplying a second stage pumping voltage $3*V_{in}$ to an output stage alternately through the first electrodes of the capacitors $C_3$ and $C_4$.

The transistor $N_5$ serves as the output stage of the charge pump 10, functioning as a diode for only allowing the charge pump 10 to output the pumping voltage $V_{pp}$. Due to the effect of the transistor $N_5$, the pumping voltage $V_{pp}$ is subjected to a voltage loss of a forward bias diode drop, required to turn on the transistor $N_5$, from the voltage of the first electrode of the capacitor $C_3$.

Under adverse effects of reverse current (or reverse charge transfer), the conventional charge pump 10 fails to achieve an efficient voltage-converting characteristic. In the prior art, the reverse current occurs in two situations where: (1) the clock signals are at steady states and (2) the clock signals make transitions from the high level to the low level or from the low level to the high level.

Firstly is described the reverse current problem the charge pump 10 is subjected to when the clock signals are at steady states. When the clock signal $CLK_1$ is at the high level and the clock signal $CLK_2$ is at the low level, such as the time interval B shown in FIG. 2(*a*), the second current electrode of the transistor $N_1$ is at the voltage of $2*V_{in}$, the second current electrode of the transistor $N_2$ is at the voltage of $V_{in}$, the second current electrode of the transistor $N_3$ is at the voltage of $3*V_{in}$, the second current electrode of the transistor $N_4$ is at the voltage of $2*V_{in}$. Therefore, the transistor $N_3$ has the control electrode at the voltage of $3*V_{in}$ and the first current electrode at the voltage of $V_{in}$, resulting in being turned on. Since the transistor $N_2$ is also turned on at this moment, a steady-state reverse current is discharged from the first electrode of the capacitor $C_3$, which is at the voltage of $3*V_{in}$, flowing through the transistors $N_3$ and $N_2$ sequentially, and back to the supply voltage source $V_{in}$. In such case that the steady-state reverse current exists, the charge stored in the capacitor $C_3$ cannot be fully transferred to the transistor $N_5$, i.e. the output stage of the charge pump 10, resulting in a reduced efficiency of generating the pumping voltage $V_{pp}$.

Followed is a description of the reverse current problem the charge pump 10 is subjected to when the clock signals make transitions. Although the capacitors $C_1$ and $C_3$ are wired to receive the same clock signal $CLK_1$ and the capacitors $C_2$ and $C_4$ are wired to receive the same clock signal $CLK_2$ in the description set forth, an amount of time delay is inevitably produced in the clock signals $CLK_1$ and $CLK_2$ due to signal distribution along the clock lines in practical circuit applications. If the time delay is considered, the capacitor $C_3$ actually receives a clock signal $CLK_3$ as shown in FIG. 2(*b*), which is a delayed signal from the clock signal $CLK_1$, and the capacitor $C_4$ actually receives a clock signal $CLK_4$ as shown in FIG. 2(*b*), which is a delayed signal from the clock signal $CLK_2$.

When the clock signals $CLK_1$ and $CLK_3$ are both at the low level and the clock signals $CLK_2$ and $CLK_4$ are both at the high level, such as a time interval A shown in FIG. 2(*b*), the second current electrode of the transistor $N_1$ is at the voltage of $V_{in}$, the second current electrode of the transistor $N_2$ is at the voltage of $2*V_{in}$, the second current electrode of the transistor $N_3$ is at the voltage of $2*V_{in}$, the second current electrode of the transistor $N_4$ is at the voltage of $3*V_{in}$. Subsequently, when the clock signal $CLK_2$ makes a transition from the high level to the low level, the clock signal $CLK_4$ still retains the high level due to the time delay, such as a time interval C shown in FIG. 2(*b*). At this moment, both of the clock signals $CLK_1$ and $CLK_3$ stay at the low level because of the non-overlapping arrangement described above. In this case, the first current electrode of the transistor $N_3$ since coupled to the second current electrode of the transistor $N_2$ is pulled downwardly to a voltage of $V_{in}$. Because the control electrode of the transistor $N_3$ is at the voltage of $3*V_{in}$, the transistor $N_3$ is turned on such that a transition-state reverse current is discharged from the first electrode of the capacitor $C_3$, which is at the voltage of $2*V_{in}$, flowing through the transistor $N_3$ and back to the first electrode of the capacitor $C_2$. In such case that the transition-state reverse current exists, the first electrode of the capacitor $C_3$ cannot be fully charged to the desired voltage of $2*V_{in}$, causing that the first electrode of the capacitor $C_3$ cannot be fully pushed upwardly to the desired voltage of $3*V_{in}$ when the clock signal $CLK_3$ subsequently makes a transition from the low level to the high level, such as a time interval B shown in FIG. 2(*b*). As a result, the efficiency of generating the pumping voltage $V_{pp}$ by the charge pump 10 is reduced.

SUMMARY OF INVENTION

In view of the above-mentioned problems, an object of the present invention is to provide a charge pump capable of preventing from the reverse current when the clock signals are at steady states, thereby enhancing the efficiency of generating the pumping voltage.

Another object of the present invention is to provide a charge pump capable of preventing from the reverse current when the clock signals make transitions, thereby enhancing the efficiency of generating the pumping voltage.

First and second clock signals are applied to first and second capacitors, respectively. The first clock signal alternately swings between a first clock high level and a first clock low level. The second clock signal alternately swings between a second clock high level and a second clock low level. The second clock high level and the first clock high level are non-overlapping in time with respect to each other.

First and second former-stage clock signals are applied to first and second former-stage capacitors, respectively. The first former-stage clock signal alternately swings between a first former-stage clock high level and a first former-stage clock low level. The second former-stage clock signal alternately swings between a second former-stage clock high level and a second former-stage clock low level. The second former-stage clock high level and the first former-stage clock high level are non-overlapping in time with respect to each other.

When turned on, a first switching circuit couples the second former-stage capacitor with the first capacitor such that an amount of charge is transferred between the second former-stage capacitor and the first capacitor. When turned on, a second switching circuit couples the first former-stage capacitor with the second capacitor such that an amount of charge is transferred between the first former-stage capacitor and the second capacitor.

When the first clock signal is at the first clock high level and the second former-stage clock signal is at the second former-stage clock low level, a first reverse current preventing circuit turns off the first switching circuit, thereby preventing a first steady-state reverse current from flowing through the first switching circuit out of the first capacitor.

The first reverse current preventing circuit includes a first PMOS transistor and a first NMOS transistor. The first PMOS transistor is controlled by the first clock signal through the first capacitor. When the first clock signal is at the first clock low level and the second clock signal is at the second clock high level, the first PMOS is turned on such that the second clock signal controls the first switching circuit through the second capacitor. The first NMOS transistor is controlled by the first clock signal through the first capacitor. When the first clock signal is at the first clock high level and the second former-stage clock signal is at the second former-stage clock low level, the first NMOS is turned on such that the second former-stage clock signal controls the first switching circuit through the second former-stage capacitor.

When the second clock signal is at the second clock high level and the first former-stage clock signal is at the first former-stage clock low level, a second reverse current preventing circuit turns off the second switching circuit, thereby preventing a second steady-state reverse current from flowing through the second switching circuit out of the second capacitor.

The second reverse current preventing circuit includes a second PMOS transistor and a second NMOS transistor. The second PMOS transistor is controlled by the second clock signal through the second capacitor. When the second clock signal is at the second clock low level and the first clock signal is at the first clock high level, the second PMOS is turned on such that the first clock signal controls the second switching circuit through the first capacitor. The second NMOS transistor is controlled by the second clock signal through the second capacitor. When the second clock signal is at the second clock high level and the first former-stage clock signal is at the first former-stage clock low level, the second NMOS is turned on such that the first former-stage clock signal controls the second switching circuit through the first former-stage capacitor.

A second clock falling edge of the second clock signal from the second clock high level to the second clock low level occurs earlier in time than a second former-stage clock falling edge of the second former-stage clock signal from the second former-stage clock high level to the second former-stage clock low level. A second former-stage clock rising edge of the second former-stage clock signal from the second former-stage clock low level to the second former-stage clock high level occurs earlier in time than a second clock rising edge of the second clock signal from the second clock low level to the second clock high level. In this case, when the second clock signal and the second former-stage clock signal make transitions, the first switching circuit is turned off for preventing a first transition-state reverse current from flowing through the first switching circuit out of the first capacitor.

A first clock falling edge of the first clock signal from the first clock high level to the first clock low level occurs earlier in time than a first former-stage clock falling edge of the first former-stage clock signal from the first former-stage clock high level to the first former-stage clock low level. A first former-stage clock rising edge of the first former-stage clock signal from the first former-stage clock low level to the first former-stage clock high level occurs earlier in time than a first clock rising edge of the first clock signal from the first clock low level to the first clock high level. When the first clock signal and the first former-stage clock signal make transitions, the second switching circuit is turned off for preventing a second transition-state reverse current from flowing through the second switching circuit out of the second capacitor.

BRIEF DESCRIPTION OF DRAWINGS

The above-mentioned and other objects, features, and advantages of the present invention will become apparent with reference to the following descriptions and accompanying drawings, wherein:

FIG. 3(*b*) is a detailed circuit diagram showing a reverse current preventing charge pump according to a second embodiment of the present invention;

FIG. 4(*b*) is a waveform timing chart showing reverse current preventing clock signals applied to the charge pump according to the third embodiment of the present invention;

FIG. 6(*b*) is a waveform timing chart showing reverse current preventing clock signals applied to the charge pump according to the fifth embodiment of the present invention.

DETAILED DESCRIPTION

The preferred embodiments according to the present invention will be described in detail with reference to the drawings.

Figure 3A:
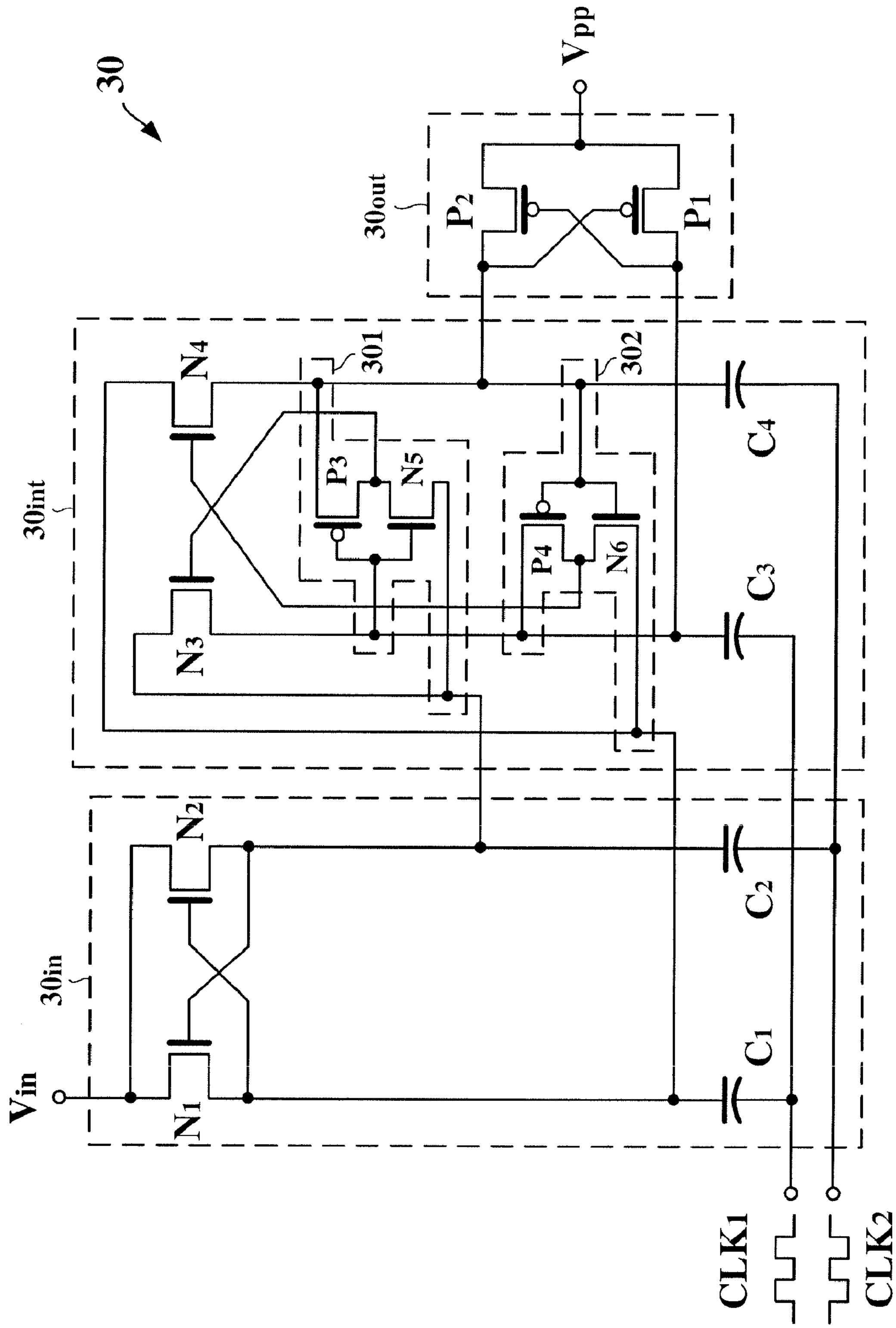
FIG. 3(*a*) is a detailed circuit diagram showing a reverse current preventing charge pump according to a first embodiment of the present invention.
Figure 3B:
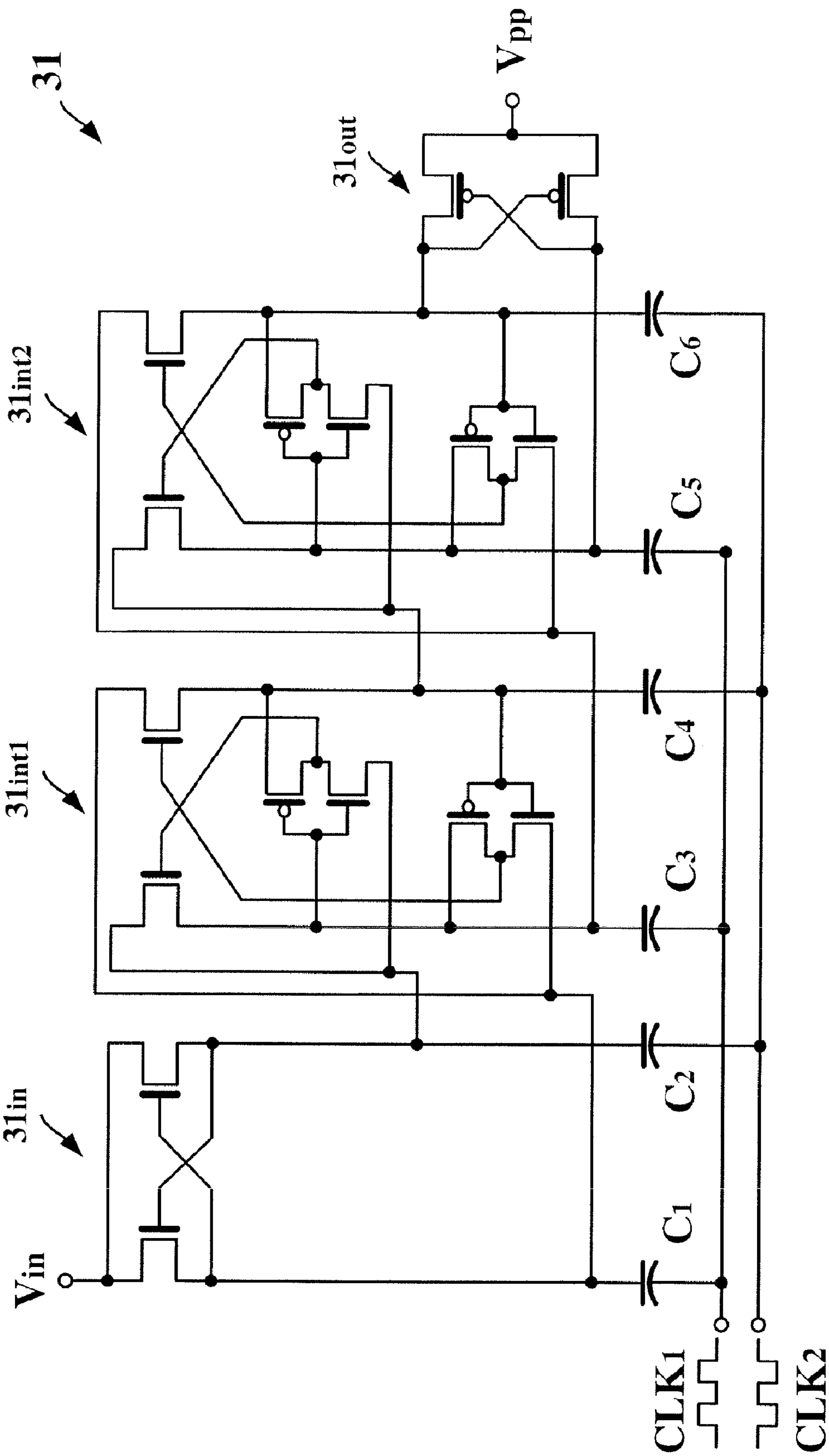

FIG. 3(*a*) is a detailed circuit diagram showing a reverse current preventing charge pump 30 according to a first embodiment of the present invention. Referring to FIG. 3(*a*), the charge pump 30 according to the first embodiment of the present invention includes an input stage $\mathbf{30}_{in}$, an intermediate stage $\mathbf{30}_{int}$, and an output stage $\mathbf{30}_{out}$. As for the input stage $\mathbf{30}_{in}$, specifically, NMOS transistors $N_1$ and $N_2$ have first current electrodes together coupled to a supply voltage source $V_{in}$. A control electrode of the NMOS transistor $N_1$ is coupled to a second current electrode of the NMOS transistor $N_2$ while a control electrode of the NMOS transistor $N_2$ is coupled to a second current electrode of the NMOS transistor $N_1$. A capacitor $C_1$ has a first electrode coupled to the second current electrode of the NMOS transistor $N_1$ while a capacitor $C_2$ has a first electrode coupled to the second current electrode of the NMOS transistor $N_2$.

As for the intermediate stage $\mathbf{30}_{int}$, specifically, an NMOS transistor $N_3$ has a first current electrode coupled to the second current electrode of the NMOS transistor $N_2$ while an NMOS transistor $N_4$ has a first current electrode coupled to the second current electrode of the NMOS transistor $N_1$. A control electrode of the NMOS transistor $N_3$ is controlled by a reverse current preventing circuit 301 while a control electrode of the NMOS transistor $N_4$ is controlled by a reverse current preventing circuit 302. A capacitor $C_3$ has a first electrode coupled to the second current electrode of the NMOS transistor $N_3$ while a capacitor $C_4$ has a first electrode coupled to the second current electrode of the NMOS transistor $N_4$.

As for the output stage $\mathbf{30}_{out}$, specifically, a PMOS transistor $P_1$ has a first current electrode coupled to the second current electrode of the NMOS transistor $N_3$ while a PMOS transistor $P_2$ has a first current electrode coupled to the second current electrode of the NMOS transistor $N_4$. A control electrode of the PMOS transistor $P_1$ is coupled to the second current electrode of the NMOS transistor $N_4$ while a control electrode of the PMOS transistor $P_2$ is coupled to the second current electrode of the NMOS transistor $N_3$. The PMOS transistors $P_1$ and $P_2$ have second current electrodes coupled together, at which a pumping voltage $V_{PP}$ of the charge pump 30 is asserted.

Figure 2A:
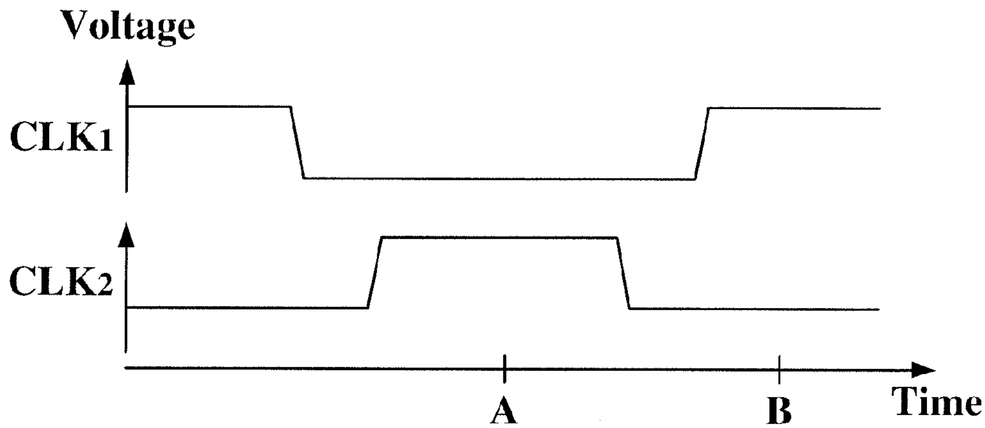
FIGS. 2(*a*) and 2(*b*) are waveform timing charts showing conventional clock signals.
Figure 2B:
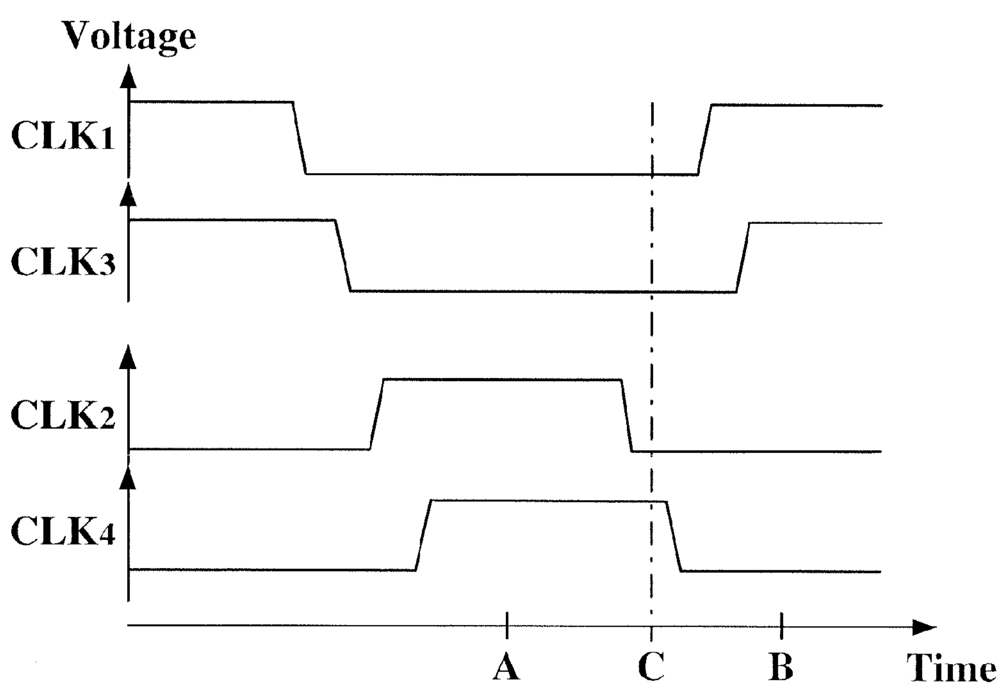

The charge pump 30 according to the first embodiment of the present invention performs charge transferring operations under the control of the conventional clock signals $CLK_1$ and $CLK_2$ shown in FIG. 2(*a*) so as to achieve the voltage boosting characteristic. For the sake of simplicity, the description of the clock signals $CLK_1$ and $CLK_2$ should be referred to the paragraphs set forth and omitted in the following paragraphs.

Figure 1:
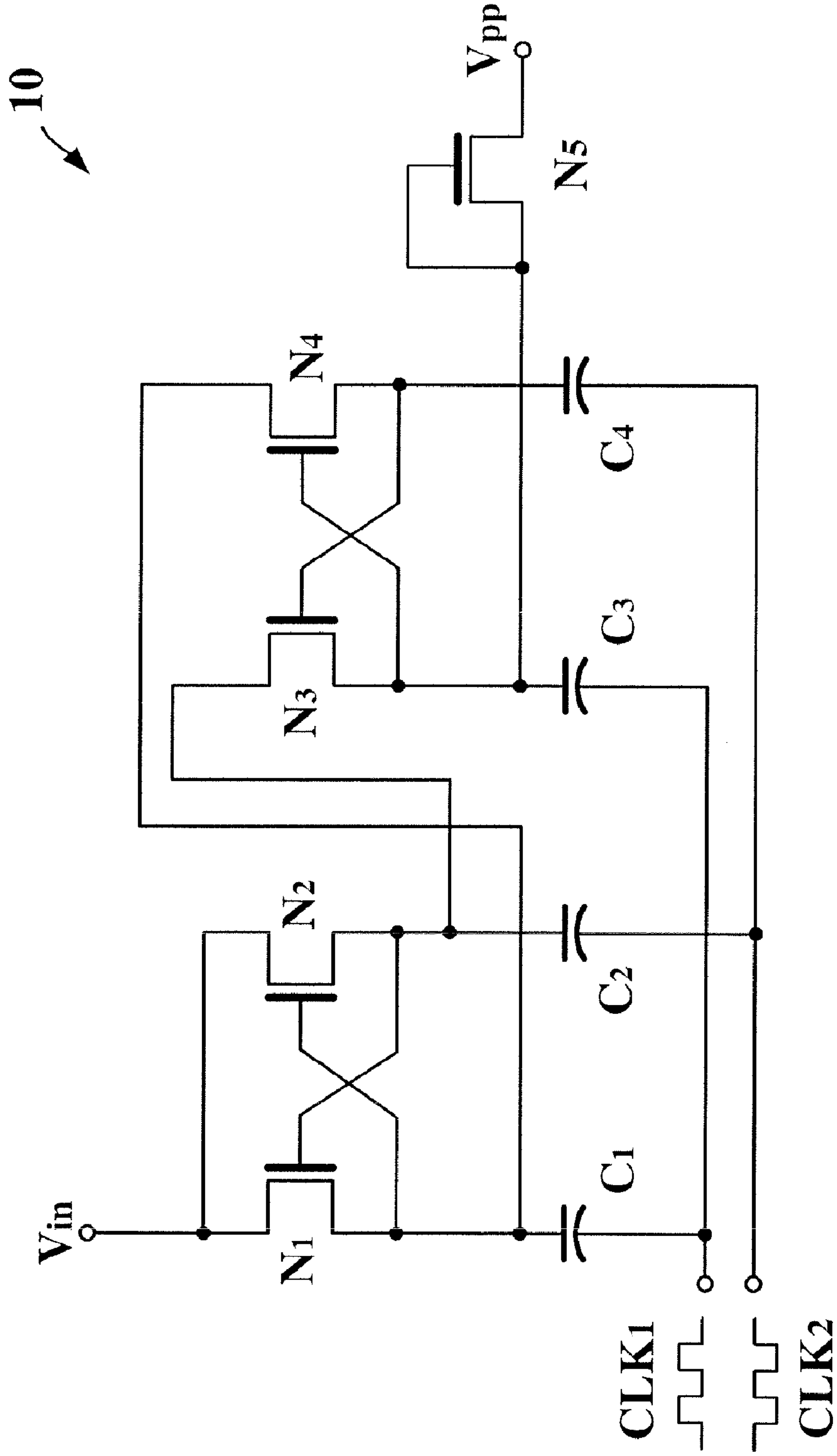
FIG. 1 is a detailed circuit diagram showing a conventional charge pump.

As clearly seen from comparison of FIG. 1 and FIG. 3(*a*), the charge pump 30 according to the first embodiment of the present invention is different from the conventional charge pump 10 in that: (1) the intermediate stage $\mathbf{30}_{int}$ of the charge pump 30 is additionally provided with the reverse current preventing circuits 301 and 302, and (2) the output stage $\mathbf{30}_{out}$ is implemented by the PMOS transistors $P_1$ and $P_2$.

The first reverse current preventing circuit 301 applies a dynamic bias to the control electrode of the transistor $N_3$ for preventing a reverse current from flowing in a direction from the second current electrode toward the first current electrode of the transistor $N_3$ but allowing a forward current to flow in the opposite direction from the first current electrode toward the second current electrode of the transistor $N_3$. For achieving the effect of preventing the reverse current, the first reverse current preventing circuit 301 detects the voltages of the first and second current electrodes of the transistor $N_3$ and then applies a disable bias to the control electrode of the transistor $N_3$ when the second current electrode is higher in voltage than the first current electrode, causing the transistor $N_3$ to be nonconductive. In the embodiment shown in FIG. 3(*a*), the reverse current preventing circuit 301 includes a PMOS transistor $P_3$ and an NMOS transistor $N_5$. The transistor $P_3$ has a first current electrode coupled to the second current electrode of the transistor $N_4$, a control electrode coupled to the second current electrode of the transistor $N_3$, and a second current electrode coupled to the control electrode of the transistor $N_3$. The transistor $N_5$ has a first current electrode coupled to the second current electrode of the transistor $P_3$, a control electrode coupled to the second current electrode of the transistor $N_3$, and a second current electrode coupled to the first current electrode of the transistor $N_3$.

The second reverse current preventing circuit 302 applies a dynamic bias to the control electrode of the transistor $N_4$ for preventing a reverse current from flowing in a direction from the second current electrode toward the first current electrode of the transistor $N_4$ but allowing a forward current to flow in the opposite direction from the first current electrode toward the second current electrode of the transistor $N_4$. For achieving the effect of preventing the reverse current, the second reverse current preventing circuit 302 detects the voltages of the first and second current electrodes of the transistor $N_4$ and then applies a disable bias to the control electrode of the transistor $N_4$ when the second current electrode is higher in voltage than the first current electrode, causing the transistor $N_4$ to be nonconductive. In the embodiment shown in FIG. 3(*a*), the reverse current preventing circuit 302 includes a PMOS transistor $P_4$ and an NMOS transistor $N_6$. The transistor $P_4$ has a first current electrode coupled to the second current electrode of the transistor $N_3$, a control electrode coupled to the second current electrode of the transistor $N_4$, and a second current electrode coupled to the control electrode of the transistor $N_4$. The transistor $N_6$ has a first current electrode coupled to the second current electrode of the transistor $P_4$, a control electrode coupled to the second current electrode of the transistor $N_4$, and a second current electrode coupled to the first current electrode of the transistor $N_4$.

Hereinafter is described in detail an operation of the charge pump 30 according to the first embodiment of the present invention with reference to the drawings. When the clock signal $CLK_1$ is at the low level and the clock signal $CLK_2$ is at the high level, such as the time interval A shown in FIG. 2(*a*), the second current electrode of the transistor $N_1$ is at the voltage of $V_{in}$, the second current electrode of the transistor $N_2$ is at the voltage of $2*V_{in}$, the second current electrode of the transistor $N_3$ is at the voltage of $2*V_{in}$, the second current electrode of the transistor $N_4$ is at the voltage of $3*V_{in}$. Therefore, the transistor $P_3$ is conductive and the transistor $N_5$ is nonconductive, resulting in that the reverse current preventing circuit 301 applies an enable bias of $3*V_{in}$ to the control electrode of the transistor $N_3$ for turning on the transistor $N_3$. As a result, the first electrode of the capacitor $C_2$ supplies the first stage pumping voltage $2*V_{in}$ to the first electrode of the capacitor $C_3$ through the forward current, thereby sustaining the first electrode of the capacitor $C_3$ at the voltage of $2*V_{in}$. On the other hand, because the transistor $P_4$ is nonconductive and the transistor $N_6$ is conductive, the reverse current preventing circuit 302 applies a disable bias of $V_{in}$ to the control electrode of the transistor $N_4$ for turning off the transistor $N_4$. Therefore, the reverse current preventing circuit 302 effectively prevents the prior art steady-state reverse current from flowing through the transistor $N_4$. As a result, the charge stored in the capacitor $C_4$ is completely transferred to generate the pumping voltage $V_{pp}$ of $3*V_{in}$ through the conductive transistor $P_2$ of the output stage $\mathbf{30}_{out}$.

Subsequently, when the clock signal $CLK_1$ is at the high level and the clock signal $CLK_2$ is at the low level, such as the time interval B shown in FIG. 2(*a*), the second current electrode of the transistor $N_1$ is at the voltage of $2*V_{in}$, the second current electrode of the transistor $N_2$ is at the voltage of $V_{in}$, the second current electrode of the transistor $N_3$ is at the voltage of $3*V_{in}$, the second current electrode of the transistor $N_4$ is at the voltage of $2*V_{in}$. Therefore, the transistor $P_4$ is conductive and the transistor $N_6$ is nonconductive, resulting in that the reverse current preventing circuit 302 applies an enable bias of $3*V_{in}$ to the control electrode of the transistor $N_4$ for turning on the transistor $N_4$. As a result, the first electrode of the capacitor $C_1$ supplies the first stage pumping voltage $2*V_{in}$ to the first electrode of the capacitor $C_4$ through the forward current, thereby sustaining the first electrode of the capacitor $C_4$ at the voltage of $2*V_{in}$. On the other hand, because the transistor $P_3$ is nonconductive and the transistor $N_5$ is conductive, the reverse current preventing circuit 301 applies a disable bias of $V_{in}$ to the control electrode of the transistor $N_3$ for turning off the transistor $N_3$. Therefore, the reverse current preventing circuit 301 effectively prevents the prior art steady-state reverse current from flowing through the transistor $N_3$. As a result, the charge stored in the capacitor $C_3$ is completely transferred to generate the pumping voltage $V_{pp}$ of $3*V_{in}$ through the conductive transistor $P_1$ of the output stage $\mathbf{30}_{out}$.

The output stage $\mathbf{30}_{out}$ implemented by the cross-coupled transistors $P_1$ and $P_2$ provides two advantages in which: (1) whether the clock signal $CLK_1$ is at the low level and the clock signal $CLK_2$ is at the high level, such as the time interval A shown in FIG. 2(*a*), or the clock signal $CLK_1$ is at the high level and the clock signal $CLK_2$ is at the low level, such as the time interval B shown in FIG. 2(*a*), the charge pump 30 according to the present invention supplies the pumping voltage $V_{pp}$ of $3*V_{in}$ alternately through the transistors $P_1$ and $P_2$, and (2) the output stage $\mathbf{30}_{out}$ never causes the prior art loss of the forward bias diode drop.

It is should be noted that although the above-described output stage $\mathbf{30}_{out}$ is implemented by the cross-coupled transistor $P_1$ and $P_2$, the present invention is not limited to this and may be applied to a case that the output stage $\mathbf{30}_{out}$ is implemented by only one of the transistors $P_1$ and $P_2$, or another case that the output stage $\mathbf{30}_{out}$ is implemented by the prior art diode-coupled NMOS transistor. No matter how the output stage $\mathbf{30}_{out}$ is modified or implemented, the reverse current preventing function provided by the intermediate stage $\mathbf{30}_{int}$ of the charge pump 30 according to the first embodiment of the present invention stays unaffected.

It should be noted that although the above-described intermediate stage $\mathbf{30}_{int}$ is provided with both of the reverse current preventing circuits 301 and 302, the present invention is not limited to this and may be applied to a case that the intermediate stage $\mathbf{30}_{int}$ is provided with either the reverse current preventing circuit 301 or the reverse current preventing circuit 302. Although the charge pump 30 is only able to prevent the reverse current from flowing the transistor $N_3$ (or $N_4$) if provided only with the reverse current preventing circuit 301 (or 302), the charge pump 30 still generates the pumping voltage $V_{pp}$ with a higher efficiency than the prior art charge pump 10 without prevention from the reverse current.

FIG. 3(*b*) is a detailed circuit diagram showing a reverse current preventing charge pump 31 according to a second embodiment of the present invention. Referring to FIG. 3(*b*), the charge pump 31 according to the second embodiment of the present invention includes an input stage $\mathbf{31}_{in}$, first and second intermediate stages $\mathbf{31}_{int1}$ and $\mathbf{31}_{int2}$, and an output stage $\mathbf{31}_{out}$. The input stage $\mathbf{31}_{in}$ is substantially identical to the input stage $\mathbf{30}_{in}$ shown in FIG. 3(*a*). Each of the intermediate stages $\mathbf{31}_{int1}$ and $\mathbf{31}_{int2}$ is substantially identical to the intermediate stage $\mathbf{30}_{int}$ shown in FIG. 3(*a*). The output stage $\mathbf{31}_{out}$ is substantially identical to the output stage $\mathbf{30}_{out}$ shown in FIG. 3(*a*). In other words, the charge pump according to the second embodiment of the present invention can be expanded in size through cascading a plurality of identical intermediate stages. Each of the intermediate stages enhances the pumping voltage generated by a previous stage with a voltage of $V_{in}$ if assumed the amplitude of the clock signals is $V_{in}$. With regard to a charge pump having N intermediate stages, its output stage may supply a pumping voltage of $(N+2)*V_{in}$ since the input stage also enhances the supply voltage source $V_{in}$ with a voltage of $V_{in}$. Therefore, the charge pump 31 having two intermediate stages $\mathbf{31}_{int1}$ and $\mathbf{31}_{int2}$ shown in FIG. 3(*b*) generates a pumping voltage $V_{pp}$ of $4*V_{in}$.

Figure 4A:
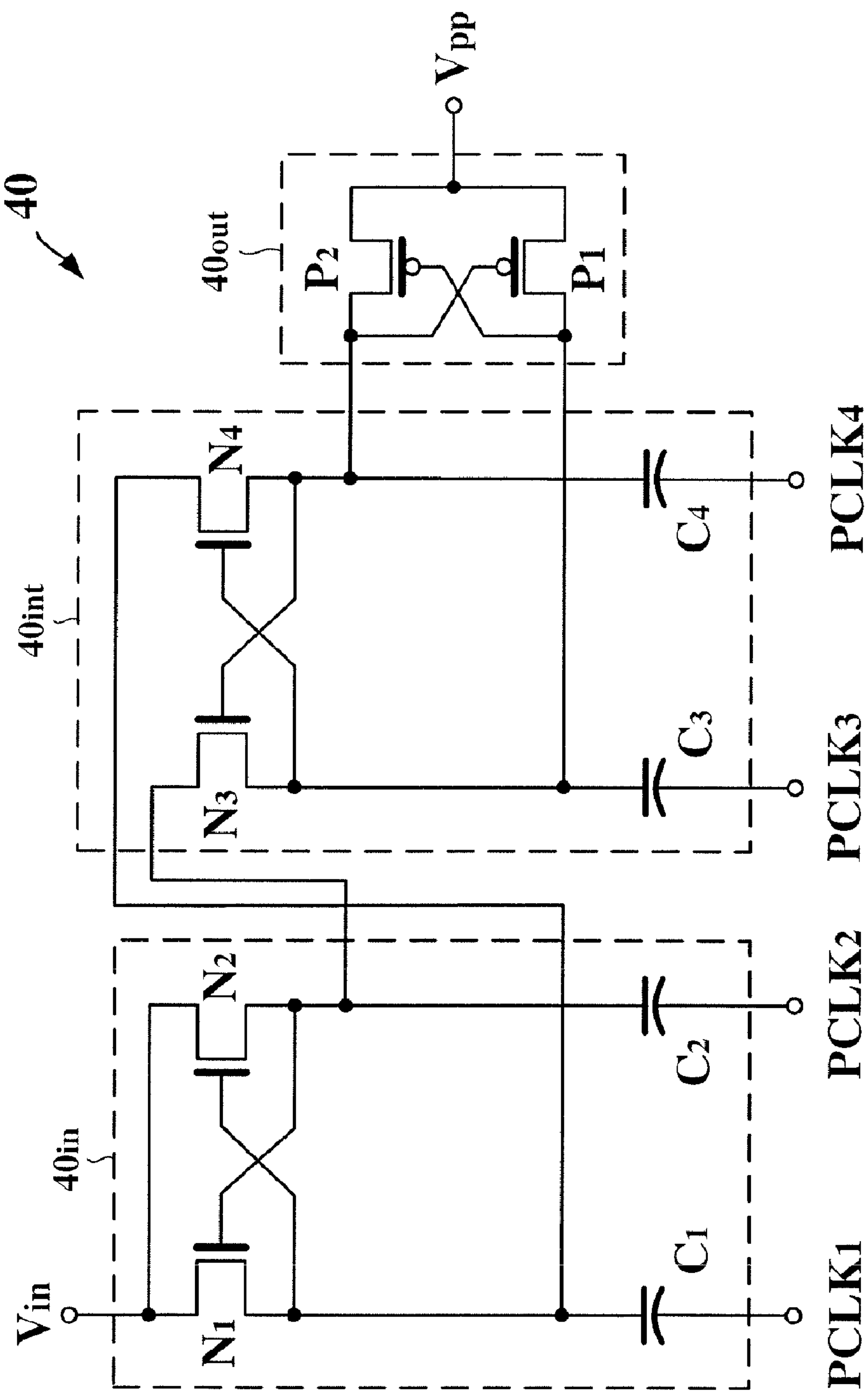
FIG. 4(*a*) is a detailed circuit diagram showing a reverse current preventing charge pump according to a third embodiment of the present invention.
Figure 4B:
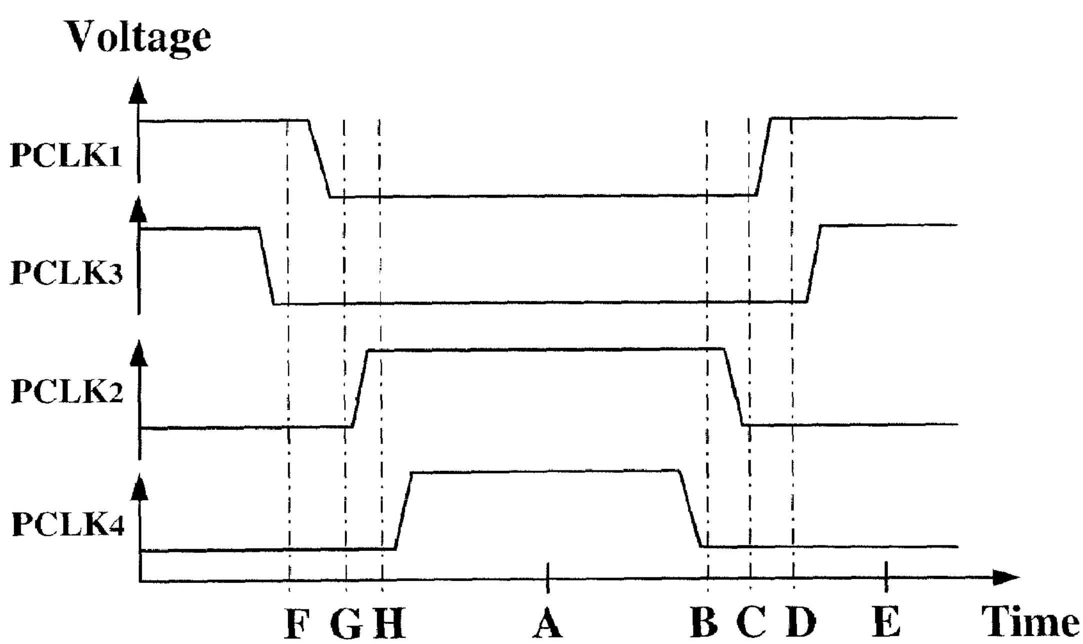

FIG. 4(*a*) is a detailed circuit diagram showing a reverse current preventing charge pump 40 according to a third embodiment of the present invention. Referring to FIG. 4(*a*), the charge pump 40 according to the third embodiment of the present invention includes an input stage $\mathbf{40}_{in}$, an intermediate stage $\mathbf{40}_{int}$, and an output stage $\mathbf{40}_{out}$. The input stage $\mathbf{40}_{in}$ is substantially identical to the input stage $\mathbf{30}_{in}$ shown in FIG. 3(*a*). The output stage $\mathbf{40}_{out}$ is substantially identical to the output stage $\mathbf{30}_{out}$ shown in FIG. 3(*a*). Although the intermediate stage 40 is not provided with the reverse current preventing circuits 301 and 302 of the first embodiment, and therefore is substantially identical to the input stage $\mathbf{40}_{in}$, the charge pump 40 utilizes four reverse current preventing clock signals $PCLK_1$ to $PCLK_4$ shown in FIG. 4(*b*), respectively applied to the capacitors $C_1$ to $C_4$ for performing the voltage boosting characteristic, in order to overcome the reverse current problem when the clock signals make transitions.

More specifically, the reverse current preventing clock signals $PCLK_1$ and $PCLK_2$ are applied to the second electrodes of the capacitors $C_1$ and $C_2$ of the input stage $\mathbf{40}_{in}$, respectively. The clock signals $PCLK_1$ and $PCLK_2$ are a same-stage complementary pair of pulse trains with equal amplitude. In addition, the clock signals $PCLK_1$ and $PCLK_2$ are so designed as to be non-overlapping with respect to each other for avoiding synchronous occurrence of a high level. Typically, the amplitude of the clock signals $PCLK_1$ and $PCLK_2$ alternately swings between the supply voltage source $V_{in}$ and a ground potential. On the other hand, the reverse current preventing clock signals $PCLK_3$ and $PCLK_4$ are applied to the second electrodes of the capacitors $C_3$ and $C_4$ of the intermediate stage $\mathbf{40}_{int}$, respectively. The clock signals $PCLK_3$ and $PCLK_4$ are a same-stage complementary pair of pulse trains with equal amplitude. In addition, the clock signals $PCLK_3$ and $PCLK_4$ are so designed as to be non-overlapping with respect to each other for avoiding synchronous occurrence of a high level. Typically, the amplitude of the clock signals $PCLK_3$ and $PCLK_4$ alternately swings between the supply voltage source $V_{in}$ and a ground potential.

The clock signals $PCLK_1$ and $PCLK_3$ belong to an adjacent-stage covering pair of pulse trains. For each clock cycle, a falling edge of the latter-stage clock signal $PCLK_3$ from the high level to the low level must occur earlier in time than a falling edge of the former-stage clock signal $PCLK_1$ from the high level to the low level, and a rising edge of the former-stage clock signal $PCLK_1$ from the low level to the high level must occur earlier in time than a rising edge of the latter-stage clock signal $PCLK_3$ from the low level to the high level. In other words, the low level of the former-stage clock signal $PCLK_1$ is completely covered in time within the low level of the latter-stage clock signal $PCLK_3$. That is, the high level of the latter-stage clock signal $PCLK_3$ is completely covered in time within the high level of the former-stage clock signal $PCLK_1$. On the other hand, the clock signals $PCLK_2$ and $PCLK_4$ belong to an adjacent-stage covering pair of pulse trains. For each clock cycle, a falling edge of the latter-stage clock signal $PCLK_4$ from the high level to the low level must occur earlier in time than a falling edge of the former-stage clock signal $PCLK_2$ from the high level to the low level, and a rising edge of the former-stage clock signal $PCLK_2$ from the low level to the high level must occur earlier in time than a rising edge of the latter-stage clock signal $PCLK_4$ from the low level to the high level. In other words, the low level of the former-stage clock signal $PCLK_2$ is completely covered in time within the low level of the latter-stage clock signal $PCLK_4$. That is, the high level of the latter-stage clock signal $PCLK_4$ is completely covered in time within the high level of the former-stage clock signal $PCLK_2$.

Hereinafter is described in detail an operation of the charge pump 40 according to the third embodiment of the present invention with reference to the drawings. When the clock signals $PCLK_1$ and $PCLK_1$ are both at the low level and the clock signals $PCLK_1$ and $PCLK_3$ are both at the high level, such as a time interval A shown in FIG. 4(*b*), the second current electrode of the transistor $N_1$ is at a voltage of $V_{in}$, the second current electrode of the transistor $N_2$ is at a voltage of $2*V_{in}$, the second current electrode of the transistor $N_3$ is at a voltage of $2*V_{in}$, the second current electrode of the transistor $N_4$ is at a voltage of $3*V_{in}$. Subsequently, when the latter-stage clock signal $PCLK_4$ makes a transition to the low level earlier in time and the former-stage clock signal $PCLK_2$ still stays at the high level, such as a time interval B shown in FIG. 4(*b*), the control electrode of the transistor $N_3$ since coupled to the second current electrode of the transistor $N_4$ is pulled downwardly to a voltage of $2*V_{in}$, turning off the transistor $N_3$. In this case, even when the former-stage clock signal $PCLK_2$ subsequently makes a transition to the low level, such as a time interval C shown in FIG. 4(*b*), pulling the first current electrode of the transistor $N_3$ since coupled to the second current electrode of the transistor $N_2$ downwardly to a voltage of $V_{in}$, the prior art transition-state reverse current is effectively prevented from flowing from the first electrode of the capacitor $C_3$ through the transistor $N_3$ to the first electrode of the capacitor $C_2$ because the transistor $N_3$ has already been turned off.

Subsequently, when the former-stage clock signal $PCLK_1$ makes a transition to the high level earlier in time and the latter-stage clock signal $PCLK_3$ still stays at the low level, such as a time interval D shown in FIG. 4(*b*), the first current electrode of the transistor $N_4$ since coupled to the second current electrode of the transistor $N_1$ is pushed upwardly to a voltage of $2*V_{in}$, becoming substantially equal in potential with respect to the second current electrode of the transistor $N_4$. In this case, even when the latter-stage clock signal $PCLK_3$ subsequently makes a transition to the high level, such as a time interval E shown in FIG. 4(*b*), pushing the control electrode of the transistor $N_4$ since coupled to the second current electrode of the transistor $N_3$ upwardly to a voltage of $3*V_{in}$ to turn on the transistor $N_4$, the transition-state reverse current never flows from the first electrode of the capacitor $C_4$ through the conductive transistor $N_4$ to the first electrode of the capacitor $C_1$ because the first and second current electrodes of the transistor $N_4$ are both substantially equal in potential.

Subsequently, when the latter-stage clock signal $PCLK_3$ makes a transition to the low level earlier in time and the former-stage clock signal $PCLK_1$ still stays at the high level, such as a time interval F shown in FIG. 4(*b*), the control electrode of the transistor $N_4$ since coupled to the second current electrode of the transistor $N_3$ is pulled downwardly to a voltage of $2*V_{in}$, turning off the transistor $N_4$. In this case, when the former-stage clock signal $PCLK_1$ subsequently makes a transition to the low level, such as a time interval G shown in FIG. 4(*b*), pulling the first current electrode of the transistor $N_4$ since coupled to the second current electrode of the transistor $N_1$ downwardly to a voltage of $V_{in}$, the prior art transition-state reverse current is effectively prevented from flowing from the first electrode of the capacitor $C_4$ through the transistor $N_4$ to the first electrode of the capacitor $C_1$ because the transistor $N_4$ has already been turned off.

Subsequently, when the former-stage clock signal $PCLK_2$ makes a transition to the high level earlier in time and the latter-stage clock signal $PCLK_4$ still stays at the low level, such as a time interval H shown in FIG. 4(*b*), the first current electrode of the transistor $N_3$ since coupled to the second current electrode of the transistor $N_2$ is pushed upwardly to a voltage of $2*V_{in}$, becoming substantially equal in potential with respect to the second current electrode of the transistor $N_3$. In this case, even when the latter-stage clock signal $PCLK_4$ subsequently makes a transition to the high level, such as the time interval A shown in FIG. 4(*b*), pushing the control electrode of the transistor $N_3$ since coupled to the second current electrode of the transistor $N_4$ upwardly to a voltage of $3*V_{in}$ to turn on the transistor $N_3$, the transition-state reverse current never flows from the first electrode of the capacitor $C_3$ through the conductive transistor $N_3$ to the first electrode of the capacitor $C_2$ because the first and second current electrodes of the transistor $N_3$ are both substantially equal in potential.

It should be noted that although the above-described charge pump 40 utilizes the four reverse current preventing clock signals $PCLK_1$ to $PCLK_4$, the present invention is not limited to this and may be applied to a case that the charge pump 40 utilizes the two reverse current preventing clock signals $PCLK_1$ and $PCLK_3$ in cooperation with the prior art clock signals $CLK_2$ and $CLK_4$, or another case that the charge pump 40 utilizes the two reverse current preventing clock signals $PCLK_2$ and $PCLK_4$ in cooperation with the prior art clock signals $CLK_1$ and $CLK_3$. Although the charge pump 40 is only able to prevent the transition-state reverse current from flowing through the transistor $N_4$ (or $N_3$) if only the reverse current preventing clock signals $PCLK_1$ and $PCLK_3$ (or $PCLK_2$ and $PCLK_4$) are utilized, the charge pump 40 still generates the pumping voltage $V_{pp}$ with a higher efficiency than the prior art charge pump 10 without prevention from the reverse current.

Figure 5:
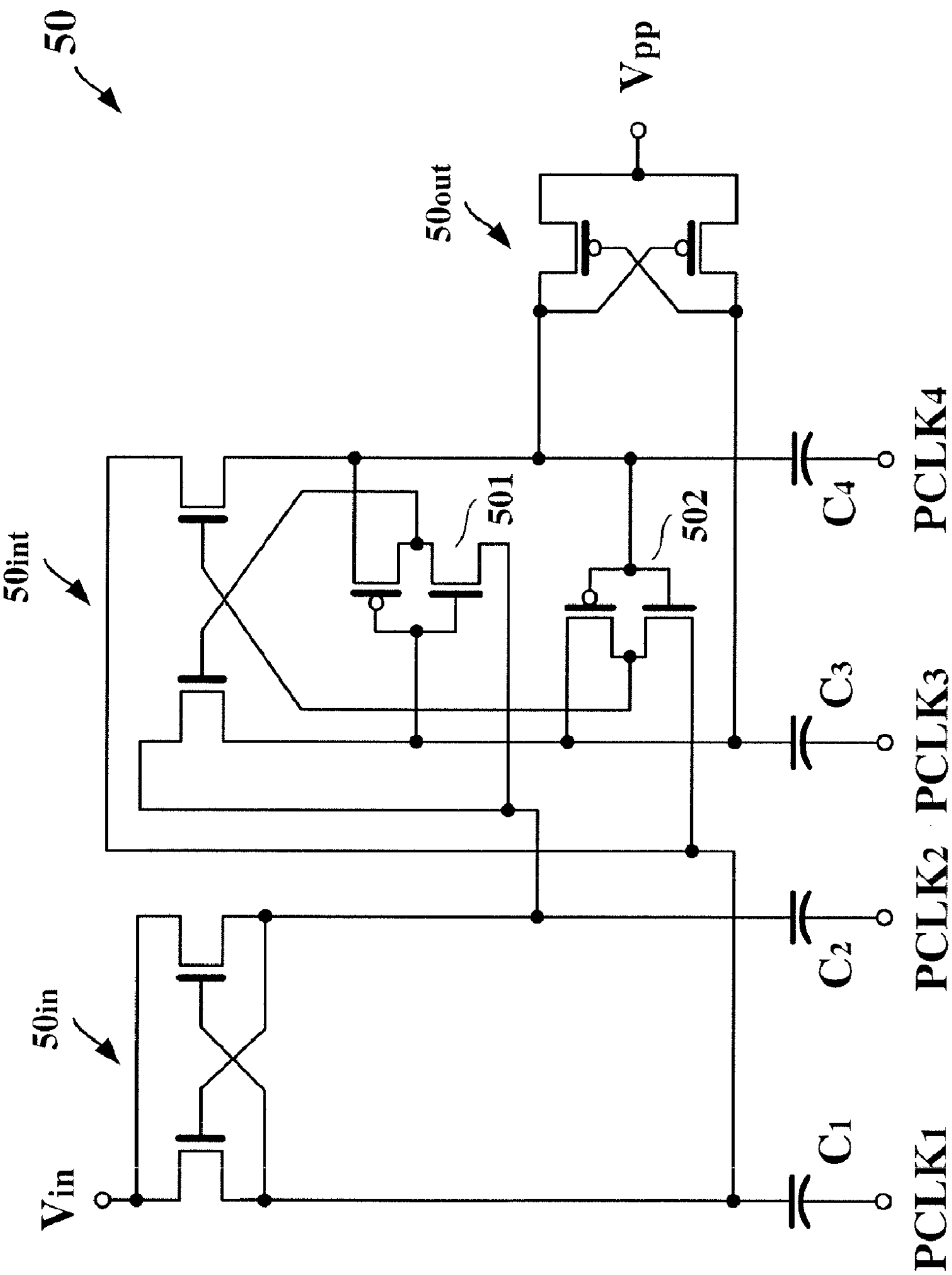
FIG. 5 is a detailed circuit diagram showing a reverse current preventing charge pump according to a fourth embodiment of the present invention.

FIG. 5 is a detailed circuit diagram showing a reverse current preventing charge pump 50 according to a fourth embodiment of the present invention. Referring to FIG. 5, the charge pump 50 according to the fourth embodiment of the present invention is essentially a combination of the charge pump 30 of the first embodiment and the charge pump 40 of the third embodiment. More specifically, the charge pump 50 includes an input stage $\mathbf{50}_{in}$, an output stage $\mathbf{50}_{out}$, and an intermediate stage $\mathbf{50}_{int}$ provided with reverse current preventing circuits 501 and 502 according to the first embodiment. Also, the charge pump 50 utilizes reverse current preventing clock signals $PCLK_1$ to $PCLK_4$ according to the third embodiment, respectively applied to the capacitors $C_1$ to $C_4$, for the voltage boosting operation. Therefore, the charge pump 50 effectively overcomes the reverse current problems both when the clock signals are at steady states and when the clock signals make transitions, achieving the optimum efficiency of converting voltage according to the present invention.

Figure 6A:
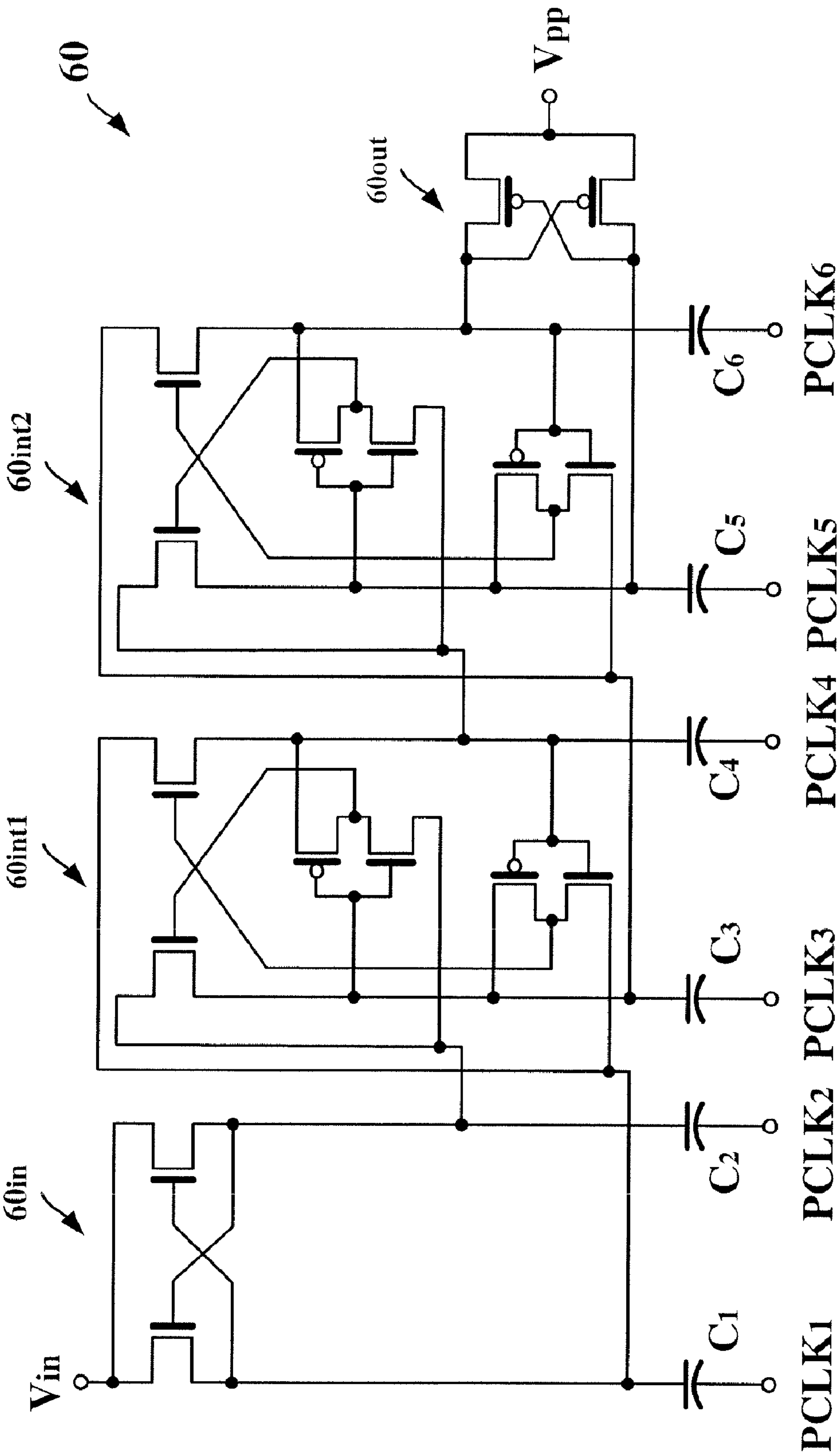
FIG. 6(*a*) is a detailed circuit diagram showing a reverse current preventing charge pump according to a fifth embodiment of the present invention.
Figure 6B:
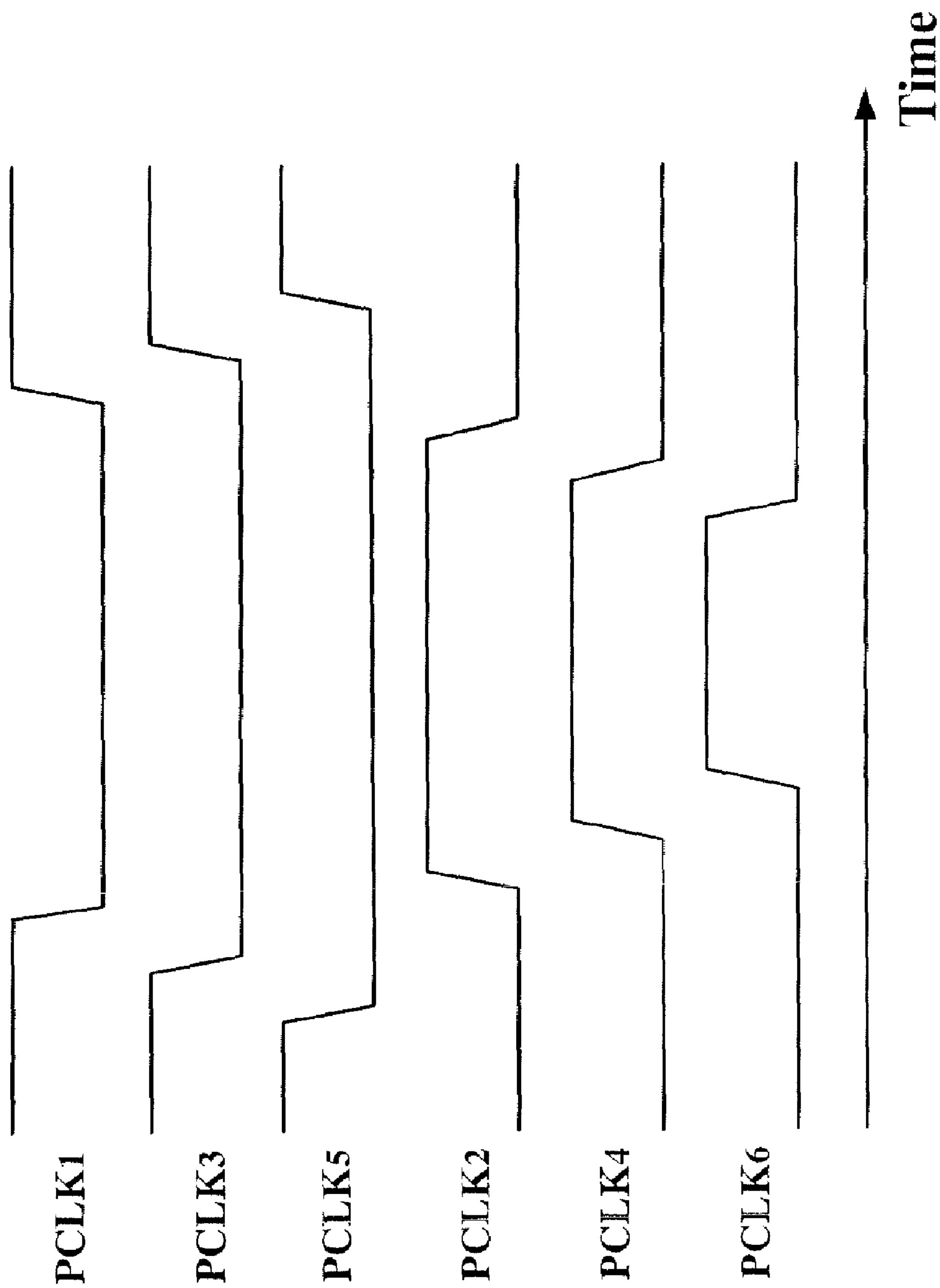

FIG. 6(*a*) is a detailed circuit diagram showing a reverse current preventing charge pump 60 according to a fifth embodiment of the present invention. Referring to FIG. 6(*a*), the charge pump 60 according to the fifth embodiment of the present invention includes an input stage $\mathbf{60}_{in}$, first and second intermediate stages $\mathbf{60}_{int1}$ and $\mathbf{60}_{int2}$, and an output stage $\mathbf{60}_{out}$. The input stage $\mathbf{60}_{in}$ is substantially identical to the input stage $\mathbf{50}_{in}$ shown in FIG. 5. Each of the first and second intermediate stages $\mathbf{60}_{int1}$ and $\mathbf{60}_{int2}$ is substantially identical to the intermediate stage $\mathbf{50}_{int}$ shown in FIG. 5. The output stage $\mathbf{60}_{out}$ is substantially identical to the output stage $\mathbf{50}_{out}$ shown in FIG. 5. In other words, the charge pump 60 according to the fifth embodiment of the present invention can be expanded in size through cascading a plurality of identical intermediate stages.

Along with the increase of the number of the intermediate stages, the necessary number of the reverse current preventing clock signals must be increased because each of the intermediate stages utilizes as the clock signals a same-stage complementary pair of non-overlapping pulse trains swinging typically between the supply voltage source $V_{in}$ and a ground potential, as described above. Since the charge pump 60 according to the fifth embodiment of the present invention is provided with six capacitors $C_1$ to $C_6$, six reverse current preventing clock signals $PCLK_1$ to $PCLK_6$ are necessary for performing the voltage boosting operations. In accordance with the circuit configuration shown in FIG. 6(*a*), each pair of the clock signals $PCLK_1$ and $PCLK_2$, the clock signals $PCLK_3$ and $PCLK_4$, and the clock signals $PCLK_5$ and $PCLK_6$ belongs to a same-stage complementary pair of pulse trains. Moreover, each pair of the clock signals $PCLK_1$ and $PCLK_3$, the clock signals of $PCLK_3$ and $PCLK_5$, the clock signals $PCLK_2$ and $PCLK_4$, and the clock signals $PCLK_4$ and $PCLK_6$ belongs to an adjacent-stage covering pair of pulse trains. Like the clock signals of the third embodiment described above with reference to FIG. 4(*b*), for overcoming the reverse current problem when the clock signals make transitions, each of the adjacent-stage covering pairs of clock signals according to the fifth embodiment has the following timing relationship for each clock cycle: (1) a falling edge of the latter-stage clock signal must occur earlier in time than a falling edge of the former-stage clock signal, and (2) a rising edge of the former-stage clock signal must occur earlier in time than a rising edge of the latter-stage clock signal. In other words, the low level of the former-stage clock signal is completely covered in time within the low level of the latter-stage clock signal. That is, the high level of the latter-stage clock signal is completely covered in time within the high level of the former-stage clock signal. Based on such timing relationship as a design rule, the reverse current preventing clock signals $PCLK_1$ to $PCLK_6$ shown in FIG. 6(*b*) is provided for applying to the charge pump 60 according to the fifth embodiment of the present invention.

Each of the intermediate stages enhances the pumping voltage generated by a previous stage with a voltage of $V_{in}$ if assumed the amplitude of the clock signals is $V_{in}$. With regard to a charge pump having N intermediate stages, its output stage may supply a pumping voltage of $(N+2)*V_{in}$ since the input stage also enhances the supply voltage source $V_{in}$ with a voltage of $V_{in}$. Therefore, the charge pump 60 having two intermediate stages $\mathbf{60}_{int1}$ and $60_{int2}$ shown in FIG. 6(*a*) generates a pumping voltage $V_{pp}$ of $4*V_{in}$.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A high efficiency charge pump, comprising:

a first clock signal alternately swinging between a first clock high level and a first clock low level;

a second clock signal alternately swinging between a second clock high level and a second clock low level, in which the second clock high level and the first clock high level are non-overlapping in time with respect to each other;

a first capacitor to which the first clock signal is applied;

a second capacitor to which the second clock signal is applied;

a first former-stage clock signal alternately swinging between a first former-stage clock high level and a first former-stage clock low level;

a second former-stage clock signal alternately swinging between a second former-stage clock high level and a second former-stage clock low level, in which the second former-stage clock high level and the first former-stage clock high level are non-overlapping in time with respect to each other;

a first former-stage capacitor to which the first former-stage clock signal is applied;

a second former-stage capacitor to which the second former-stage clock signal is applied;

a circuit for charging the first former-stage capacitor and the second former-stage capacitor;

a first switching circuit for coupling the second former-stage capacitor with the first capacitor when turned on, such that an amount of charge is transferred between the second former-stage capacitor and the first capacitor;

a second switching circuit for coupling the first former-stage capacitor with the second capacitor when turned on, such that an amount of charge is transferred between the first former-stage capacitor and the second capacitor; and a first reverse current preventing circuit for turning off the first switching circuit when the first clock signal is at the first clock high level and the second former-stage clock signal is at the second former-stage clock low level, thereby preventing a first steady-state reverse current from flowing through the first switching circuit out of the first capacitor, wherein:

the first former-stage clock low level is shorter in time than the first clock low level and is completely covered in time within the first clock low level, and the second clock high level is shorter in time than the second former-stage clock high level and is completely covered in time within the second former-stage clock high level.

2. The high efficiency charge pump according to claim 1, wherein:

the first reverse current preventing circuit controls the first switching circuit by using the second former-stage clock signal through the second former-stage capacitor for turning off the first switching circuit when the first clock signal is at the first clock high level and the second former-stage clock signal is at the second former-stage clock low level.

3. The high efficiency charge pump according to claim 1, wherein:

the first reverse current preventing circuit controls the first switching circuit by using the second clock signal through the second capacitor for turning on the first switching circuit when the first clock signal is at the first clock low level and the second clock signal is at the second clock high level.

4. The high efficiency charge pump according to claim 1, wherein:

the first reverse current preventing circuit includes:

a first PMOS transistor controlled by the first clock signal through the first capacitor, in which the first PMOS is turned on when the first clock signal is at the first clock low level and the second clock signal is at the second clock high level, such that the second clock signal controls the first switching circuit through the second capacitor, and a first NMOS transistor controlled by the first clock signal through the first capacitor, in which the first NMOS is turned on when the first clock signal is at the first clock high level and the second former-stage clock signal is at the second former-stage clock low level, such that the second former-stage clock signal controls the first switching circuit through the second former-stage capacitor.

5. The high efficiency charge pump according to claim 1, further comprising:

a second reverse current preventing circuit for turning off the second switching circuit when the second clock signal is at the second clock high level and the first former-stage clock signal is at the first former-stage clock low level, thereby preventing a second steady-state reverse current from flowing through the second switching circuit out of the second capacitor.

6. The high efficiency charge pump according to claim 5, wherein:

the second reverse current preventing circuit controls the second switching circuit by using the first former-stage clock signal through the first former-stage capacitor for turning off the second switching circuit when the second clock signal is at the second clock high level and the first for-mer-stage clock signal is at the first former-stage clock low level.

7. The high efficiency charge pump according to claim 5, wherein:

the second reverse current preventing circuit controls the second switching circuit by using the first clock signal through the first capacitor for turning on the second switching circuit when the second clock signal is at the second clock low level and the first clock signal is at the first clock high level.

8. The high efficiency charge pump according to claim 5, wherein:

the second reverse current preventing circuit includes:

a second PMOS transistor controlled by the second clock signal through the second capacitor, in which the second PMOS is turned on when the second clock signal is at the second clock low level and the first clock signal is at the first clock high level, such that the first clock signal controls the second switching circuit through the first capacitor, and a second NMOS transistor controlled by the second clock signal through the second capacitor, in which the second NMOS is turned on when the second clock signal is at the second clock high level and the first former-stage clock signal is at the first former-stage clock low level, such that the first former-stage clock signal controls the second switching circuit through the first former-stage capacitor.

9. A high efficiency charge pump, comprising:

a first clock signal alternately swinging between a first clock high level and a first clock low level;

a second clock signal alternately swinging between a second clock high level and a second clock low level, in which the second clock high level and the first clock high level are non-overlapping in time with respect to each other;

a first capacitor to which the first clock signal is applied;

a second capacitor to which the second clock signal is applied;

a first former-stage clock signal alternately swinging between a first former-stage clock high level and a first former-stage clock low level;

a second former-stage clock signal alternately swinging between a second former-stage clock high level and a second former-stage clock low level, in which the second former-stage clock high level and the first former-stage clock high level are non-overlapping in time with respect to each other;

a first former-stage capacitor to which the first former-stage clock signal is applied;

a second former-stage capacitor to which the second former-stage clock signal is applied;

a circuit for charging the first former-stage capacitor and the second former-stage capacitor;

a first switching circuit for coupling the second former-stage capacitor with the first capacitor when turned on, such that an amount of charge is transferred between the second former-stage capacitor and the first capacitor; and a second switching circuit for coupling the first former-stage capacitor with the second capacitor when turned on, such that an amount of charge is transferred between the first former-stage capacitor and the second capacitor, wherein:

the first former-stage clock low level is shorter in time than the first clock low level and is completely covered in time within the first clock low level, and the second clock high level is shorter in time than the second former-stage clock high level and is completely covered in time within the second former-stage clock high level.

10. The high efficiency charge pump according to claim 9, wherein:

the first switching circuit is controlled by the second clock signal through the second capacitor, and the second switching circuit is controlled by the first clock signal through the first capacitor.

11. The high efficiency charge pump according to claim 9, wherein:

the first clock high level is equal to the second clock high level;

the first clock low level is equal to the second clock low level;

the first former-stage clock high level is equal to the second former-stage clock high level; and the first former-stage clock low level is equal to the second former-stage clock low level.

12. The high efficiency charge pump according to claim 9, wherein:

the first switching circuit is an NMOS transistor having a control electrode coupled to the second capacitor, a first current electrode coupled to the second former-stage capacitor, and a second current electrode coupled to the first capacitor.

13. The high efficiency charge pump according to claim 9, wherein:

the second switching circuit is an NMOS transistor having a control electrode coupled to the first capacitor, a first current electrode coupled to the first former-stage capacitor, and a second current electrode coupled to the second capacitor.

14. A method of converting a voltage with high efficiency, comprising steps of:

applying to a first capacitor a first clock signal alternately swinging between a first clock high level and a first clock low level;

applying to a second capacitor a second clock signal alternately swinging between a second clock high level and a second clock low level, in which the second clock high level and the first clock high level are non-overlapping in time with respect to each other;

applying to a first former-stage capacitor a first former-stage clock signal alternately swinging between a first former-stage clock high level and a first former-stage clock low level;

applying to a second former-stage capacitor a second former-stage clock signal alternately swinging between a second former-stage clock high level and a second former-stage clock low level, in which the second former-stage clock high level and the first former-stage clock high level are non-overlapping in time with respect to each other;

coupling a first current electrode of a first switching circuit with the second former-stage capacitor and coupling a second current electrode of the first switching circuit with the first capacitor;

coupling a first current electrode of a second switching circuit with the first former-stage capacitor and coupling a second current electrode of the second switching circuit with the second capacitor;

charging the first former-stage capacitor and the second former-stage capacitor;

coupling a control electrode of the first switching circuit with the second current electrode of the second switching circuit when the first clock signal is at the first clock low level and the second clock signal is at the second clock high level; and coupling the control electrode of the first switching circuit with the first current electrode of the first switching circuit when the first clock signal is at the first clock high level and the second former-stage clock signal is at the second former-stage clock low level, wherein:

the first former-stage clock low level is shorter in time than the first clock low level and is completely covered in time within the first clock low level, and the second clock high level is shorter in time than the second former-stage clock high level and is completely covered in time within the second former-stage clock high level.

15. The method according to claim 14, further comprising steps of:

coupling a control electrode of the second switching circuit with the second current electrode of the first switching circuit when the second clock signal is at the second clock low level and the first clock signal is at the first clock high level, and coupling the control electrode of the second switching circuit with the first current electrode of the second switching circuit when the second clock signal is at the second clock high level and the first former-stage clock signal is at the first former-stage clock low level.

* * * * *